United States Patent
Pike

(10) Patent No.: US 10,740,449 B2
(45) Date of Patent: Aug. 11, 2020

(54) AUTHENTICATION METHODS AND SYSTEMS

(71) Applicants: LICENTIA GROUP LIMITED, Cardiff, South Glamorgan (GB); MYPINPAD LIMITED, Cardiff, South Glamorgan (GB)

(72) Inventor: Justin Pike, Blackwood (GB)

(73) Assignees: LICENTIA GROUP LIMITED, Cardiff, South Glamorgan (GB); MYPINPAD LIMITED, Cardiff, South Glamorgan (GB)

(*) Notice: Subject to any disclaimer, the term of this patent is extended or adjusted under 35 U.S.C. 154(b) by 153 days.

(21) Appl. No.: 15/576,910

(22) PCT Filed: May 27, 2016

(86) PCT No.: PCT/GB2016/051553
§ 371 (c)(1),
(2) Date: Nov. 27, 2017

(87) PCT Pub. No.: WO2016/189325
PCT Pub. Date: Dec. 1, 2016

(65) Prior Publication Data
US 2018/0150630 A1    May 31, 2018

(30) Foreign Application Priority Data

May 27, 2015 (GB) .................................... 1509030.1
May 27, 2015 (GB) .................................... 1509031.9
(Continued)

(51) Int. Cl.
*G06F 21/00*      (2013.01)
*G06F 21/36*      (2013.01)
(Continued)

(52) U.S. Cl.
CPC ............ *G06F 21/36* (2013.01); *G06F 3/0489* (2013.01); *G06F 3/04886* (2013.01);
(Continued)

(58) Field of Classification Search
CPC .......... G06F 21/36; G06F 21/32; G06F 21/31; G06F 3/04886; G06F 3/0489;
(Continued)

(56) References Cited

U.S. PATENT DOCUMENTS 2,819,067 A    1/1958   Dusenbury
3,201,732 A    8/1965   Olsen
(Continued)

FOREIGN PATENT DOCUMENTS

CN     100583113 C     3/2005
CN     101082948 A     12/2007
(Continued)

OTHER PUBLICATIONS https://patentscope.wipo.int/search/en/detail.jsf?docId=WO2011116570&tab=PCTBI BLIO&maxRec=1 000 (Year: 2010).
(Continued)

*Primary Examiner* — Yogesh Paliwal
(74) *Attorney, Agent, or Firm* — Gordon & Jacobson, P.C.

(57) ABSTRACT

The invention provides a solution for secure authentication of an individual. The invention comprises methods and apparatus for secure input of a user's identifier e.g. PIN. An image of a keypad is superimposed over a scrambled, operable keypad within a display zone of a screen associated with an electronic device. The keypad image depicts a non-scrambled keypad, in that the keys depicted in the image are in an expected or standardised format or order. The difference in positions of the keys depicted in the image, and those in the operable keypad, provides a mapping which
(Continued)

enables an encoded form of the identifier to be generated, such that the un-encoded version is never stored in the device's memory. Preferably, the image depicts a keypad which is standard for the device which it is being shown on. The device may be a mobile phone, a tablet computer, laptop, PC, payment terminal or any other electronic computing device with a screen. The underlying keypad, which is at least partially obscured from the user's view by the image, may be generated at run time by a procedure call. Preferably, this procedure is native to the device ie part of a library which is provided as standard with the device.

15 Claims, 1 Drawing Sheet

(30) Foreign Application Priority Data

Nov. 24, 2015 (GB) .................................. 1520741.8
Nov. 24, 2015 (GB) .................................. 1520760.8

(51) Int. Cl.
| | | |
|---|---|---|
| G06Q 20/32 | (2012.01) | |
| G06Q 20/40 | (2012.01) | |
| G07F 7/10 | (2006.01) | |
| G06F 21/32 | (2013.01) | |
| G06Q 20/20 | (2012.01) | |
| G06F 3/0488 | (2013.01) | |
| G06F 3/0489 | (2013.01) | |
| G06Q 20/10 | (2012.01) | |
| G06F 7/58 | (2006.01) | |
| G06Q 20/38 | (2012.01) | |
| H04L 9/08 | (2006.01) | |
| G06Q 20/36 | (2012.01) | |

(52) U.S. Cl.
CPC ......... *G06F 21/32* (2013.01); *G06Q 20/1085* (2013.01); *G06Q 20/206* (2013.01); *G06Q 20/32* (2013.01); *G06Q 20/3226* (2013.01); *G06Q 20/4012* (2013.01); *G06Q 20/4014* (2013.01); *G06Q 20/40145* (2013.01); *G07F 7/1033* (2013.01); *G07F 7/1041* (2013.01); *G07F 7/1075* (2013.01); *G07F 7/1091* (2013.01); *G06F 7/582* (2013.01); *G06F 7/588* (2013.01); *G06Q 20/36* (2013.01); *G06Q 20/3829* (2013.01); *G06Q 2220/00* (2013.01); *H04L 9/0866* (2013.01); *H04L 2209/08* (2013.01)

(58) Field of Classification Search
CPC ........ G06F 7/582; G06F 7/588; G07F 7/1041; G07F 7/1075; G07F 7/1091; G07F 7/1033; G06Q 20/1085; G06Q 20/206; G06Q 20/32; G06Q 20/3226; G06Q 20/4012; G06Q 20/4014; G06Q 20/40145; G06Q 20/36; G06Q 20/3829; G06Q 2220/00; H04L 9/0866; H04L 2209/08
See application file for complete search history.

(56) References Cited

U.S. PATENT DOCUMENTS

| | | | |
|---|---|---|---|
| 3,255,323 A | 6/1966 | Austin | |
| 3,270,720 A | 9/1966 | Ehrhardt | |
| 3,347,103 A | 10/1967 | High | |
| 3,364,601 A | 1/1968 | Korenek | |
| 3,375,428 A | 3/1968 | Mitchell | |
| 3,392,846 A | 7/1968 | Getzin | |
| 3,621,242 A | 11/1971 | Ferguson | |
| 5,193,152 A | 3/1993 | Smith | |
| 5,209,102 A | 5/1993 | Wang | |
| 5,234,389 A | 8/1993 | Goates | |
| 5,257,486 A | 11/1993 | Holmwall | |
| 5,363,449 A | 11/1994 | Bestock | |
| 5,504,808 A | 4/1996 | Hamrick, Jr. | |
| 5,549,194 A | 8/1996 | Dag | |
| 5,715,078 A | 2/1998 | Shiraishi | |
| 5,754,652 A | 5/1998 | Wilfong | |
| 5,949,348 A | 9/1999 | Kapp et al. | |
| 5,990,586 A | 11/1999 | Milano, Jr. | |
| 6,193,152 B1 | 2/2001 | Fernando | |
| 6,209,102 B1 | 3/2001 | Hoover | |
| 6,219,794 B1 | 4/2001 | Soutar | |
| 6,234,389 B1 | 5/2001 | Valliani | |
| 6,257,486 B1 | 7/2001 | Teicher | |
| 6,434,702 B1 | 8/2002 | Maddalozzo, Jr. | |
| 6,549,194 B1 | 4/2003 | McIntyre | |
| 6,630,928 B1 | 10/2003 | McIntyre | |
| 6,671,405 B1 | 12/2003 | Savakis | |
| 6,715,078 B1 | 3/2004 | Chasko | |
| 6,990,586 B1 | 1/2006 | Tresser | |
| 7,003,316 B1 | 2/2006 | Elias | |
| 7,010,806 B2 | 3/2006 | Bender | |
| 7,047,222 B1 | 5/2006 | Bush | |
| 7,091,845 B2 | 8/2006 | Midland | |
| 7,092,915 B2 | 8/2006 | Best | |
| 7,243,237 B2 | 7/2007 | Peinado | |
| 7,305,565 B1 | 12/2007 | Lungaro | |
| 7,395,506 B2 | 7/2008 | Tan | |
| 7,698,563 B2 | 4/2010 | Shin | |
| 7,735,121 B2 | 6/2010 | Madani | |
| 7,992,007 B2 | 8/2011 | Lazzaro | |
| 8,117,458 B2 | 2/2012 | Osborn, III | |
| 8,176,324 B1 | 5/2012 | Krishnamurthy | |
| 8,201,732 B1 | 6/2012 | Kropf | |
| 8,255,323 B1 | 8/2012 | Casey | |
| 8,270,720 B1 | 9/2012 | Ladd | |
| 8,297,173 B1 | 10/2012 | Teetzel | |
| 8,347,103 B2 | 1/2013 | Jones | |
| 8,364,601 B2 | 1/2013 | Dewan | |
| 8,375,428 B2 | 2/2013 | Won | |
| 8,392,846 B2 | 3/2013 | Carapelli | |
| 8,413,071 B2 | 4/2013 | Kim | |
| 8,453,027 B2 | 5/2013 | Bartz | |
| 8,453,207 B2 | 5/2013 | White | |
| 8,621,242 B2 | 12/2013 | Brown | |
| 8,762,876 B2 | 6/2014 | Puppin | |
| 8,965,066 B1 | 2/2015 | Derakhshani | |
| 9,082,253 B1 | 7/2015 | Harty | |
| 9,235,967 B1 | 1/2016 | Magee | |
| 9,552,465 B2 | 1/2017 | Pike | |
| 9,576,411 B2 | 2/2017 | Kim et al. | |
| 10,366,215 B2 | 7/2019 | Pike | |
| 2002/0016918 A1 | 2/2002 | Tucker | |
| 2002/0023215 A1 | 2/2002 | Wang | |
| 2002/0029342 A1 | 3/2002 | Keech | |
| 2002/0046185 A1 | 4/2002 | Villart | |
| 2002/0082962 A1 | 6/2002 | Farris | |
| 2002/0012397 A1 | 9/2002 | Hodgson | |
| 2002/0129250 A1 | 9/2002 | Kimura | |
| 2002/0188872 A1 | 12/2002 | Willeby | |
| 2003/0002667 A1 | 1/2003 | Gougeon | |
| 2003/0004877 A1 | 1/2003 | Kasasaku | |
| 2003/0120612 A1 | 6/2003 | Fujisawa | |
| 2003/0120936 A1 | 6/2003 | Farris | |
| 2003/0132918 A1 | 7/2003 | Fitch | |
| 2003/0212327 A1 | 11/2003 | Wang | |
| 2003/0229597 A1 | 12/2003 | De Jong | |
| 2003/0229598 A1 | 12/2003 | De Jong | |
| 2003/0229791 A1 | 12/2003 | De Jong | |
| 2004/0010690 A1 | 1/2004 | Shin et al. | |
| 2004/0039933 A1 | 2/2004 | Martin | |
| 2004/0044739 A1 | 3/2004 | Ziegler | |
| 2004/0073809 A1 | 4/2004 | Wing Keong | |
| 2004/0122768 A1 | 6/2004 | Creamer | |
| 2004/0122771 A1 | 6/2004 | Celi | |

(56) References Cited

U.S. PATENT DOCUMENTS

| | | |
|---|---|---|
| 2004/0182921 A1 | 9/2004 | Dickson |
| 2005/0010786 A1 | 1/2005 | Michener |
| 2005/0012715 A1 | 1/2005 | Ford |
| 2005/0036611 A1 | 2/2005 | Seaton |
| 2005/0043997 A1 | 2/2005 | Sahota |
| 2005/0075973 A1 | 4/2005 | Yousofi |
| 2005/0127156 A1 | 6/2005 | Yoo |
| 2005/0127158 A1 | 6/2005 | Figueras |
| 2005/0140832 A1 | 6/2005 | Goldman |
| 2005/0144449 A1 | 6/2005 | Voice |
| 2005/0177522 A1 | 8/2005 | Williams |
| 2005/0193208 A1 | 9/2005 | Charrette, III |
| 2005/0212763 A1 | 9/2005 | Okamura |
| 2006/0003706 A1 | 1/2006 | Welland |
| 2006/0017691 A1 | 1/2006 | Cruz-Hernandez |
| 2006/0018467 A1 | 1/2006 | Steinmetz |
| 2006/0026440 A1 | 2/2006 | Sauvebois |
| 2006/0032705 A1 | 2/2006 | Isham |
| 2006/0037067 A1 | 2/2006 | Morris |
| 2006/0104446 A1 | 5/2006 | Varghese |
| 2006/0133597 A1 | 6/2006 | Song |
| 2006/0136334 A1 | 6/2006 | Atkinson |
| 2006/0146169 A1 | 7/2006 | Segman |
| 2006/0149845 A1 | 7/2006 | Malin |
| 2006/0155619 A1 | 7/2006 | Rhiando |
| 2006/0182715 A1 | 8/2006 | Sandrock |
| 2006/0206919 A1 | 9/2006 | Montgomery |
| 2006/0221059 A1 | 10/2006 | Choi |
| 2007/0005500 A1 | 1/2007 | Steeves |
| 2007/0014415 A1 | 1/2007 | Harrison |
| 2007/0073937 A1 | 3/2007 | Feinberg |
| 2007/0089164 A1 | 4/2007 | Gao |
| 2007/0101150 A1 | 5/2007 | Oda |
| 2007/0110224 A1 | 5/2007 | Gumpel |
| 2007/0182715 A1 | 8/2007 | Fyke |
| 2007/0209014 A1 | 9/2007 | Youmtoub |
| 2007/0213090 A1 | 9/2007 | Holmberg |
| 2007/0279391 A1 | 12/2007 | Marttila |
| 2007/0282756 A1 | 12/2007 | Dravenstott |
| 2008/0011098 A1 | 1/2008 | Herremans |
| 2008/0014818 A1 | 1/2008 | Privitera |
| 2008/0110981 A1 | 5/2008 | Deline |
| 2008/0148186 A1 | 6/2008 | Krishnamurthy |
| 2008/0165035 A1 | 7/2008 | Bhella et al. |
| 2008/0172735 A1 | 7/2008 | Gao |
| 2008/0184036 A1 | 7/2008 | Kavsan |
| 2008/0209223 A1 | 8/2008 | Nandy |
| 2008/0251969 A1 | 10/2008 | Isham |
| 2008/0280652 A1 | 11/2008 | Marry |
| 2008/0289035 A1 | 11/2008 | Delia |
| 2008/0306995 A1 | 12/2008 | Newell |
| 2008/0319902 A1 | 12/2008 | Chazan |
| 2009/0033522 A1 | 2/2009 | Skillman |
| 2009/0044282 A1 | 2/2009 | Govindaraju |
| 2009/0066660 A1 | 3/2009 | Ure |
| 2009/0067627 A1 | 3/2009 | Hogl |
| 2009/0077383 A1 | 3/2009 | de Monseignat |
| 2009/0106827 A1 | 4/2009 | Cerruti et al. |
| 2009/0183098 A1 | 7/2009 | Casparian et al. |
| 2009/0193210 A1 | 7/2009 | Hewett |
| 2009/0213132 A1 | 8/2009 | Kargman |
| 2009/0235199 A1 | 9/2009 | Mastie |
| 2009/0277968 A1 | 11/2009 | Walker |
| 2009/0328197 A1 | 12/2009 | Newell |
| 2010/0036783 A1 | 2/2010 | Rodriguez |
| 2010/0049768 A1 | 2/2010 | Robert |
| 2010/0098300 A1 | 4/2010 | Otto |
| 2010/0109920 A1* | 5/2010 | Spradling ............... G06F 21/36 341/23 |
| 2010/0117792 A1 | 5/2010 | Faith |
| 2010/0121737 A1 | 5/2010 | Yoshida |
| 2010/0125509 A1 | 5/2010 | Kranzley |
| 2010/0138666 A1 | 6/2010 | Adams |
| 2010/0149100 A1 | 6/2010 | Meiby |
| 2010/0153270 A1 | 6/2010 | Hawkes |
| 2010/0174653 A1 | 7/2010 | Tian |
| 2010/0175016 A1 | 7/2010 | Tian |
| 2010/0180336 A1 | 7/2010 | Jones |
| 2010/0182244 A1 | 7/2010 | Onda |
| 2010/0215270 A1 | 8/2010 | Manohar |
| 2010/0223663 A1 | 9/2010 | Morimoto |
| 2010/0242104 A1 | 9/2010 | Wankmueller |
| 2010/0259561 A1 | 10/2010 | Forutanpour et al. |
| 2010/0287097 A1 | 11/2010 | Treadwell |
| 2010/0287382 A1 | 11/2010 | Gyorffy |
| 2010/0306283 A1 | 12/2010 | Johnson |
| 2010/0323617 A1 | 12/2010 | Hubinak |
| 2011/0004769 A1 | 1/2011 | Won |
| 2011/0018033 A1 | 1/2011 | Takenaka |
| 2011/0020414 A1 | 1/2011 | Kunin |
| 2011/0055084 A1 | 3/2011 | Singh |
| 2011/0090097 A1 | 4/2011 | Beshke |
| 2011/0109567 A1 | 5/2011 | Kim |
| 2011/0144586 A1 | 6/2011 | Michaud |
| 2011/0180336 A1 | 7/2011 | Kurata |
| 2011/0185313 A1 | 7/2011 | Harpaz et al. |
| 2011/0185319 A1 | 7/2011 | Carapelli |
| 2011/0191591 A1 | 8/2011 | Cheng |
| 2011/0191856 A1 | 8/2011 | Keen |
| 2011/0199387 A1 | 8/2011 | Newton |
| 2011/0204140 A1 | 8/2011 | Hart |
| 2011/0246369 A1 | 10/2011 | De Oliveira |
| 2011/0310019 A1 | 12/2011 | Wilson |
| 2011/0313871 A1 | 12/2011 | Greenwood |
| 2011/0321138 A1 | 12/2011 | Kruger |
| 2012/0042365 A1 | 2/2012 | Shoval |
| 2012/0047564 A1 | 2/2012 | Liu |
| 2012/0079273 A1 | 3/2012 | Bacchiaz et al. |
| 2012/0095867 A1 | 4/2012 | McKelvey |
| 2012/0096277 A1 | 4/2012 | Perez Soria |
| 2012/0098750 A1 | 4/2012 | Allen |
| 2012/0132705 A1 | 5/2012 | Golueke |
| 2012/0158672 A1 | 6/2012 | Oltean |
| 2012/0159160 A1 | 6/2012 | Poisner |
| 2012/0159582 A1 | 6/2012 | Griffin |
| 2012/0159583 A1 | 6/2012 | Griffin |
| 2012/0159592 A1 | 6/2012 | Griffin |
| 2012/0159593 A1 | 6/2012 | Griffin |
| 2012/0159594 A1 | 6/2012 | Griffin |
| 2012/0159609 A1 | 6/2012 | Griffin |
| 2012/0159613 A1 | 6/2012 | Griffin |
| 2012/0159614 A1 | 6/2012 | Griffin |
| 2012/0159616 A1 | 6/2012 | Griffin |
| 2012/0185398 A1 | 7/2012 | Weis |
| 2012/0222100 A1 | 8/2012 | Fisk |
| 2012/0222102 A1 | 8/2012 | Hirose |
| 2012/0249295 A1 | 10/2012 | Yeung |
| 2012/0253971 A1 | 10/2012 | Bansal |
| 2012/0256723 A1 | 10/2012 | Grover |
| 2012/0260326 A1 | 10/2012 | Steigmann |
| 2012/0291120 A1 | 11/2012 | Griffin |
| 2012/0305648 A1 | 12/2012 | Sondhi |
| 2012/0311723 A1 | 12/2012 | Britt, Jr. |
| 2012/0313858 A1 | 12/2012 | Park |
| 2012/0323788 A1 | 12/2012 | Keresman, III |
| 2013/0018800 A1 | 1/2013 | Devaraju |
| 2013/0019320 A1 | 1/2013 | Ericsson |
| 2013/0020389 A1 | 1/2013 | Barnett |
| 2013/0021233 A1 | 1/2013 | Umminger |
| 2013/0023240 A1 | 1/2013 | Weiner |
| 2013/0026513 A1 | 1/2013 | Aurongzeb |
| 2013/0029824 A1 | 1/2013 | De Koning |
| 2013/0042318 A1 | 2/2013 | Thatha |
| 2013/0047237 A1 | 2/2013 | Ahn |
| 2013/0050088 A1 | 2/2013 | Smith |
| 2013/0060739 A1 | 3/2013 | Kalach |
| 2013/0078951 A1 | 3/2013 | Mun |
| 2013/0086382 A1 | 4/2013 | Barnett |
| 2013/0091583 A1 | 4/2013 | Karroumi |
| 2013/0106690 A1 | 5/2013 | Lim |
| 2013/0148044 A1 | 6/2013 | Ohyama |
| 2013/0154937 A1 | 6/2013 | Park |
| 2013/0198459 A1 | 8/2013 | Joshi |
| 2013/0207902 A1 | 8/2013 | Showering |

(56) References Cited

U.S. PATENT DOCUMENTS

| | | |
|---|---|---|
| 2013/0232549 A1 | 9/2013 | Hawkes |
| 2013/0265136 A1 | 10/2013 | Wadia |
| 2013/0298246 A1 | 11/2013 | Cragun |
| 2013/0301830 A1 | 11/2013 | Bar-El |
| 2014/0002558 A1 | 1/2014 | Ramesh |
| 2014/0013252 A1 | 1/2014 | Ehrler |
| 2014/0025580 A1 | 1/2014 | Bacastow |
| 2014/0162598 A1 | 6/2014 | Villa-Real |
| 2014/0168083 A1 | 6/2014 | Ellard |
| 2014/0283022 A1 | 9/2014 | Beloncik |
| 2014/0310531 A1 | 10/2014 | Kundu et al. |
| 2015/0095241 A1 | 4/2015 | Edwards |
| 2015/0116225 A1 | 4/2015 | Luo et al. |
| 2015/0154598 A1 | 6/2015 | Forte |
| 2015/0261968 A1 | 9/2015 | Polyachenko |
| 2015/0347774 A1 | 12/2015 | Krstic |
| 2015/0350163 A1 | 12/2015 | Brander |
| 2015/0371213 A1 | 12/2015 | Pike |
| 2015/0379288 A1 | 12/2015 | Kubik |
| 2016/0034718 A1 | 2/2016 | Mizrachi |
| 2016/0042190 A1 | 2/2016 | Adderly |
| 2016/0063230 A1 | 3/2016 | Alten |
| 2016/0065546 A1 | 3/2016 | Krishna |
| 2016/0125193 A1 | 5/2016 | Dai Zovi |
| 2016/0154980 A1 | 6/2016 | Neumann |
| 2016/0224771 A1 | 8/2016 | Pike |
| 2016/0246955 A1 | 8/2016 | Jiang |
| 2016/0253508 A1 | 9/2016 | Song |
| 2016/0283013 A1 | 9/2016 | Engstrom et al. |
| 2016/0314293 A1 | 10/2016 | Pike |
| 2016/0320965 A1 | 11/2016 | Chung |
| 2016/0337857 A1 | 11/2016 | Carron et al. |
| 2017/0006140 A1 | 1/2017 | Park |
| 2017/0061138 A1* | 3/2017 | Lambert ............... H04L 63/18 |
| 2017/0061408 A1 | 3/2017 | Choi |
| 2017/0140354 A1 | 5/2017 | Jenkins |
| 2017/0192670 A1 | 7/2017 | Raman |
| 2017/0235926 A1 | 8/2017 | Fyke |
| 2017/0270764 A1 | 9/2017 | Riedel |
| 2018/0032831 A1 | 2/2018 | Kim |
| 2018/0150623 A1 | 5/2018 | Pike |
| 2018/0150629 A1 | 5/2018 | Pike |
| 2018/0150630 A1 | 5/2018 | Pike |

FOREIGN PATENT DOCUMENTS

| | | |
|---|---|---|
| CN | 101126967 A | 2/2008 |
| CN | 201035502 Y | 3/2008 |
| CN | 201111222 Y | 9/2008 |
| CN | 202150070 U | 2/2012 |
| DE | 4129202 | 3/1993 |
| DE | 4129202 A1 | 3/1993 |
| DE | 19803339 A1 | 8/1999 |
| DE | 10100188 | 7/2002 |
| DE | 10306352 A1 | 9/2004 |
| DE | 102008050609 A1 | 10/2009 |
| DE | 102008056605 A1 | 5/2010 |
| DE | 102009022845 | 9/2010 |
| DE | 102009022845 A1 | 9/2010 |
| DE | 102009023925 A1 | 12/2010 |
| DE | 102010022368 A1 | 12/2011 |
| EP | 0432409 A1 | 6/1991 |
| EP | 0662665 A2 | 7/1995 |
| EP | 0870222 A2 | 10/1998 |
| EP | 1161060 | 12/2001 |
| EP | 1161060 A1 | 12/2001 |
| EP | 1599786 A2 | 11/2005 |
| EP | 1600847 A1 | 11/2005 |
| EP | 1615181 A1 | 1/2006 |
| EP | 1742450 | 1/2007 |
| EP | 1840778 A1 | 10/2007 |
| EP | 2141647 | 1/2010 |
| EP | 2141647 A1 | 1/2010 |
| EP | 2365469 | 9/2011 |
| EP | 2400426 A1 | 12/2011 |
| EP | 2458491 | 5/2012 |
| EP | 2458491 A2 | 5/2012 |
| EP | 2466512 A1 | 6/2012 |
| EP | 2466513 A1 | 6/2012 |
| EP | 2466514 A1 | 6/2012 |
| EP | 2466515 A1 | 6/2012 |
| EP | 2466516 A1 | 6/2012 |
| EP | 2466517 A1 | 6/2012 |
| EP | 2466518 A1 | 6/2012 |
| EP | 2466519 A1 | 6/2012 |
| EP | 2466520 A1 | 6/2012 |
| EP | 2466521 A1 | 6/2012 |
| EP | 2487620 A1 | 8/2012 |
| EP | 2512090 A1 | 10/2012 |
| EP | 2523137 A1 | 11/2012 |
| FR | 2622322 | 4/1989 |
| FR | 2810067 | 12/2001 |
| FR | 2812423 A1 | 2/2002 |
| FR | 2819067 | 7/2002 |
| FR | 2923034 A1 | 5/2009 |
| FR | 2961330 A1 | 12/2011 |
| FR | 2969342 A1 | 6/2012 |
| GB | 2387702 A | 10/2003 |
| GB | 2388229 A | 11/2003 |
| GB | 2389693 A | 12/2003 |
| GB | 2402649 A | 12/2004 |
| GB | 2416058 | 1/2006 |
| GB | 2416058 A | 1/2006 |
| GB | 2427059 A | 12/2006 |
| GB | 2438886 A | 12/2007 |
| GB | 2454459 A | 5/2009 |
| GB | 2457733 | 8/2009 |
| GB | 2457733 A | 8/2009 |
| GB | 2520207 A | 5/2015 |
| GB | 2542512 | 3/2017 |
| GB | 2556474 | 5/2018 |
| JP | 1995271884 | 10/1995 |
| JP | 2000099801 A | 4/2000 |
| JP | 2003346098 | 12/2003 |
| JP | 2004102460 | 4/2004 |
| JP | 2005107678 | 4/2005 |
| JP | 2006243938 A | 9/2006 |
| JP | 2008506198 | 2/2008 |
| JP | 2008204409 A | 9/2008 |
| JP | 2008537210 | 9/2008 |
| JP | 2009199581 A | 9/2009 |
| JP | 2009237774 A | 10/2009 |
| JP | 2010126913 A | 6/2010 |
| JP | 2010533925 | 10/2010 |
| JP | 2012194648 A | 10/2012 |
| KR | 101520803 | 5/2015 |
| WO | 9311551 | 6/1993 |
| WO | 9705578 | 2/1997 |
| WO | 0025474 A1 | 5/2000 |
| WO | 0146922 | 6/2001 |
| WO | 0146922 A1 | 6/2001 |
| WO | 02071177 A2 | 9/2002 |
| WO | 03058947 | 7/2003 |
| WO | 03058947 A1 | 7/2003 |
| WO | 03058947 A2 | 7/2003 |
| WO | 2005104428 | 11/2005 |
| WO | 2005104428 A2 | 11/2005 |
| WO | 2006010058 | 1/2006 |
| WO | WO2006/064241 A2 | 6/2006 |
| WO | 2006095203 | 9/2006 |
| WO | 2007056746 | 5/2007 |
| WO | 2007143740 | 12/2007 |
| WO | 2007143740 A2 | 12/2007 |
| WO | 2009000223 A2 | 12/2008 |
| WO | 2009009788 | 1/2009 |
| WO | 2009012326 | 1/2009 |
| WO | WO2009/009788 A1 | 1/2009 |
| WO | 2009130985 | 10/2009 |
| WO | 2010131218 | 11/2010 |
| WO | 2010131218 A1 | 11/2010 |
| WO | 2010134808 | 11/2010 |
| WO | 2011093998 A1 | 8/2011 |
| WO | 2011155915 | 12/2011 |
| WO | 2011155915 A1 | 12/2011 |

(56) References Cited

FOREIGN PATENT DOCUMENTS

| WO | 12009334 A1 | 1/2012 | |
|---|---|---|---|
| WO | 2012004395 A1 | 1/2012 | |
| WO | 2012077098 A1 | 6/2012 | |
| WO | 2012131420 A1 | 10/2012 | |
| WO | 2012146587 A1 | 11/2012 | |
| WO | 2013021233 | 2/2013 | |
| WO | 2013148044 | 10/2013 | |
| WO | WO2014/013252 A2 | 1/2014 | |
| WO | WO-2014013252 A2 * | 1/2014 | ............. G06F 21/36 |
| WO | WO2014/111689 | 4/2014 | |

OTHER PUBLICATIONS https://patentscope.wipo.int/search/en/detail.jsf?docId=W02016188127&tab=PCTBI BLIO&maxRec=1 000 (Year: 2015).
Fujitsu Develops World's First Authentication Technology to Extract and match 2,048-bit Feataure Codes from Palm Vein Images, Anonymous, Fujitsu Global, (Aug. 5, 2013), Retrieved from internet URL:http://www.fujitsu.com/global/about/resources/news/press-releases/2013/0805-01.html.
Using Biometrics to Generate Public and Private Keys, Satrugna Pakala, (May 31, 2006) Retrieved from internet; URL: http://www.sci.tamucc.edu/~cams/GraduateProjects/view.php?view=266.
The Usability of Picture Passwords, FRASER, Jul. 23, 2014.
International Search Report and Written Opinion of International Application No. PCT/GB2016/051553 dated Aug. 4, 2016.
International Search Report and Written Opinion of International Application No. PCT/GB2016/051548 dated Aug. 8, 2016.
International Search Report and Written Opinion of International Application No. PCT/GB2016/051549 dated Aug. 10, 2016.
International Search Report and Written Opinion of International Application No. PCT/GB2016/051550 dated Aug. 8, 2016.
Examination Report of Indian Application No. 2301/KOLNP/2015 dated Oct. 18, 2019.
https://patentscope.wipo.int/search/en/detail.jsf?docId=WO2016188127&tab=PCTBIBLIO&maxRec=1000 (Year: 2015).
International Search Report in related PCT Application No. PCT/GB2013/051913 dated Feb. 6, 2014.
Roos, "Automatically Downloading My ING Direct Transactions-Chris Roos", Jun. 23, 2007, XP055085833.
Decision to Grant for related GB2520207.
Search Report in related GB Application No. GB1212878.1 dated Dec. 3, 2012.
Search Report issued by United Kingdom Intellectual Property Office dated Oct. 6, 2017 for Application No. GB1321505.8.
Written Opinion of the Intl Searching Authority in related PCT Application No. PCT/GB2013/051913, 201 , dated Jan. 20, 2015.
Examination Report of Application No. GB1619853.3 dated Mar. 8, 2017.
Search and Examination Report of Application No. GB1906165.4 dated Aug. 23, 2019.
Search Report cited in Office Action dated Nov. 26, 2019 of Russian Application No. 2017141194/08.
Translation of Office Action dated Nov. 26, 2019 of Russian Application No. 2017141194/08.

* cited by examiner

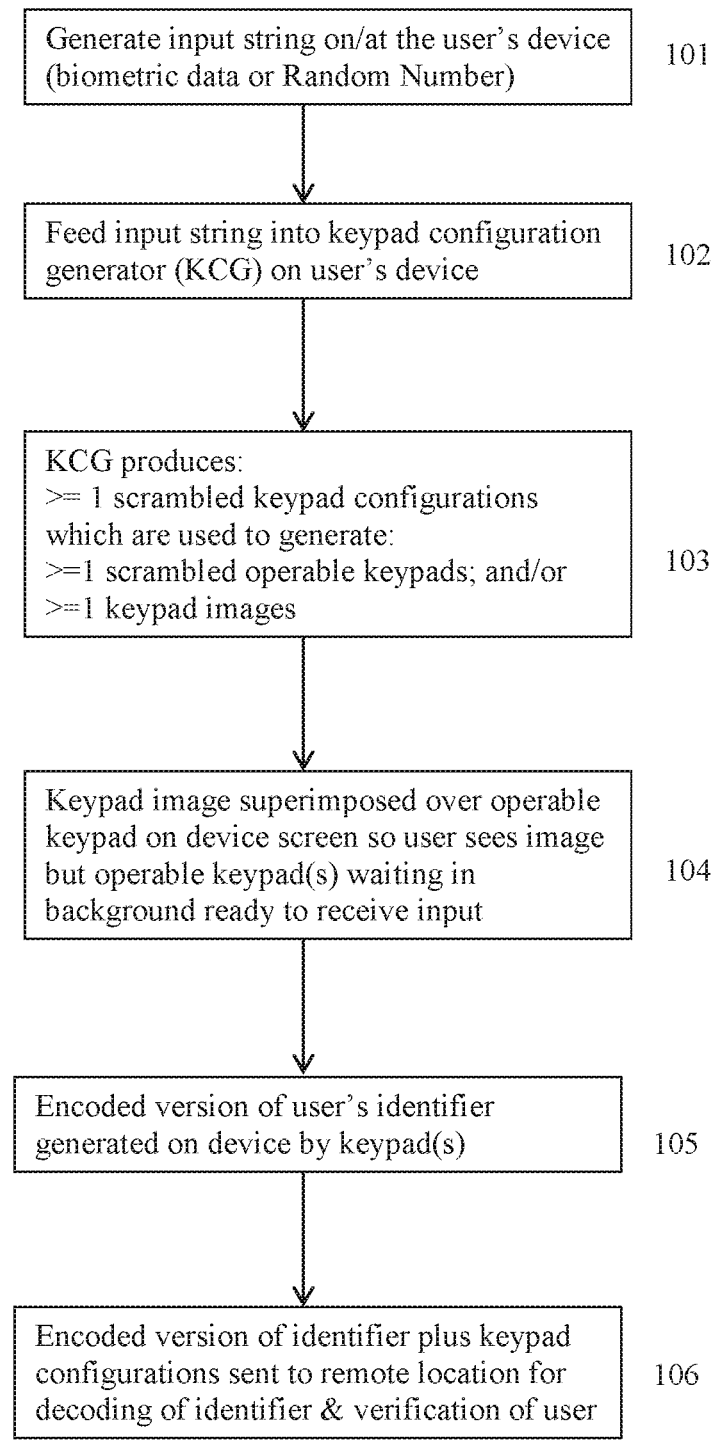

AUTHENTICATION METHODS AND SYSTEMS

CROSS-REFERENCE TO RELATED APPLICATIONS

This application is the national stage of International Patent Application No. PCT/GB2016/051553 filed on May 27, 2016, and which claims priority to British Patent Applications Nos. GB 1509030.1 filed on May 27, 2015, GB 1509031.9 filed on May 27, 2015, GB 1520760.8 filed on Nov. 24, 2015 and GB 1520741.8 filed on Nov. 24, 2015, all of which are hereby incorporated by reference in their entireties as if fully set forth herein.

BACKGROUND

1. Field

This invention relates generally to the field of user authentication. The invention is suited for use in situations where a user is required to enter an identifier or code (eg a PIN, password etc) which is validated prior to completing an operation. The operation might be any type of operation. The invention is also suited for, but not limited to, verification of the user on a mobile device such as a smartphone or tablet computer.

2. Related Art

Authentication techniques are used in a variety of situations where an individual's identity and/or authorisation needs to be verified prior to being allowed to perform an act or gain access to some controlled or managed resource such as a device, building, a computer system, a financial account, a service etc.

One common approach to authentication is to record some pre-selected identifier comprising a code or combination of symbols which is then maintained in secrecy in a secure location and available only to authorised parties. For the sake of convenience, the identifier may be referred to in this document as a Personal Identification Code (PIC) although it is important to note that the identifier may comprise other types and combinations of symbols and not just numeric digits. The term 'PIC' as used herein should not be construed as limiting the invention with respect to the type or format of the user's identifier.

After the identifier has been selected and assigned to an authorised individual (or group of individuals), the user is required to supply the correct identifier each time he requests permission to perform the controlled act or gain access to the resource or service. The user's inputted identifier is compared with the pre-stored version. If the input matches the stored identifier then the user's identity is deemed to have been verified and access is granted. Alternatively, if the input does not match the pre-stored version then access is denied.

The use of PINs has become commonplace, especially in relation to banking and financial applications. Customers have become accustomed to, and trusting of, the use of PIN-based verification. Financial institutions also favour PIN-based authentication as it provides a more secure form of verification than, for example, a signature. Further still, when a transaction requires authentication via a PIN the liability for any fraud resulting from that transaction is deemed to lie with the user who has supplied the PIN. This is in contrast to 'card not present' transactions such as on-line transactions where the liability remains with the issuing financial institution.

Another authentication approach involves using a device to capture biometric data relating to the unique physical or behavioural attributes of the individual such as iris pattern, palm geometry or fingerprint. An advantage of biometric authentication is that users do not need to remember passwords or codes, and the required information is always carried inherently by the individual wherever they go so no additional hardware such as tokens need to be carried. Therefore, biometric authentication offers a convenient and simple authentication solution which is attractive to end users.

However, despite the attractions of biometric authentication, it has yet to be widely adopted within certain industries such as the banking industry. One reason for this is that the infrastructure of the banking industry is geared towards verification using a 4 digit PIN.

This includes payment terminals, ATMs, switches, and the apparatus at both the acquiring and issuing banks, which would all need to be replaced or adapted at significant cost in order to move from PIN-based to biometric authentication. Other concerns arise in relation to the security of biometric data which may be captured from non-secure sources. For example, fingerprints can be 'lifted' from public places, voices can be recorded. In addition, while it is easy to change a stored PIN or identifier it is not possible for an individual change biometric data such as fingerprint, iris pattern etc.

These concerns can be reduced by the use of two or three-factor authentication wherein at least two of the following are used during authentication:

What you know (eg PIN, password)
Who you are (eg fingerprint, retina pattern, face or voice patterns)
What you have (eg smart card, security token, mobile device)

Therefore, a system which requires a user to authenticate with both a PIN and biometric data on a device owned or operated by the user would provide enhanced security.

With respect to mobile technology, more and more people are using handheld computing devices such as smart phones and tablet computers etc for identity-sensitive operations such as banking. However, such devices are notoriously insecure and passwords, PINs and other valuable authentication data can be compromised by third parties. Therefore, there is a significant challenge in providing an authentication solution which is secure even when used on a mobile device.

One such solution has been disclosed in WO 2014/013252 which teaches the concept of sending an image of a scrambled keypad from a server to a user's device (PC, mobile phone, tablet etc). An operable, functional keypad is generated on the device and the image is displayed on the screen in the same position as the keypad. The image is superimposed over the keypad such that it is hidden from view yet still functional in the background. The positions of the underlying keypad keys do not correspond to the positions of the same 'keys' depicted in the image. To the user, only the image of the scrambled keypad is visible and thus when the user touches or clicks on part of the image to select an input, the operable keypad interprets this input differently and an encoded version of the user's input is received into memory on the device. Thus, as the user's real identifier (eg PIN) is never entered into the keyboard buffer or elsewhere on the device it cannot be fraudulently obtained from it. The encoded identifier is then transmitted to a remote server which knows the order of keys depicted in the keypad image, and can thus decode the user's input. In effect, a mapping is created between the keypad configurations, and this mapping is used to both encode and decode the identifier. This solution provides significant advantages over other authentication techniques, because it does not require the user to remember a different identifier, does not require the use of special or additional hardware, and avoids entry of the user's real identifier into an insecure device.

EP 1615181 A1 discloses an authentication method wherein a random string is fed into an 'image generator' component. The image generator takes the random string and generates image data suitable for display on a client terminal. The image data is then used to change the appearance of the display on the terminal so as to present the user with a plurality of characters and the user then inputs his PIN by selecting characters. Each input selected by the user is recorded as positional data by the client terminal (e.g. first row, second column). This positional data is then converted by the client terminal into character data eg the numeral 2. In contrast to the WO 2014/013252 arrangement, there is no use of an operable keypad, masked by an overlying image, to perform the encoding during entry. Instead, a customised algorithm is used to post-process the positional data into an encoded version of the user's input.

SUMMARY

An alternative solution has now been devised.

Thus, in accordance with the present invention there is provided an authentication solution as defined in the appended claims.

The invention may provide a verification method. It may be used to verify or authenticate the identity of a user prior to granting access to a controlled resource. The controlled resource may be a physical resource or a virtual, electronic or digital resource. The invention may provide an enhanced security solution.

The invention may comprise the step of:
  generating an operable, scrambled keypad and providing said keypad within a display zone of a screen associated with an electronic device;
  presenting an image of a non-scrambled keypad within at least part of the display zone such that at a user is able to operate at least one operable key of the keypad via (ie through) the image.

Thus, the image and the keypad may be provided within the same display zone of the same screen. The user may enter or input an identifier by "selecting" a portion of the image. This may cause an encoded version of the user's identifier to be generated and entered into the device by the operable keypad. Thus, no post-entry transformation or processing of the identifier or its positional data is required in order to encode or translate it.

Preferably, the operable, scrambled keypad is generated at run-time (during use) by invoking a portion of code. The operable, scrambled keypad may be generated by a subroutine which is provided as standard with the device. The image may depict a keypad which is a default keypad associated with the device. The operable keypad may be or comprise an event handler (or "event listener" in some alternative programming terminologies). The event may be a keyboard event, a touchscreen event or some other input-related event.

The image may be generated on the device, or may be received by the device from a remote computing resource. The remote computing resource may be a server.

The operable keypad may be generated using a keypad configuration derived using a random, or pseudo-random, number, or biometric data relating to the user. The order of the operable keys in the operable keypad may be at least partially determined using biometric data derived from or associated with the user. Preferably, the biometric data may comprise, or be processed to provide, one or more strings, arrays or sequences of values which can be used to specify the order of the operable keys.

In this document, the phrase "biometric data" may be used to mean data which is captured directly from the user (i.e. "raw" biometric data such as may be captured by a sensor). It may also mean biometric data which has been derived from a biometric capture process. For example, it may be processed data which has been obtained or derived following a biometric authentication process.

A plurality of operable keypads may be generated. At least one keypad in the plurality may be a scrambled keypad. A plurality of keypad images may be generated. At least one image in the plurality may be an image of a non-scrambled scrambled keypad.

A mapping may be generated between keys depicted in the image of the non-scrambled keypad and the keys of the operable keypad. The mapping may enable an encoded version of an input, from the user, to be inputted into the device. The method may comprise the step of transmitting the encoded version of the input to a remote computing resource.

The electronic device may be any device having a processor and computing capabilities. It may be a handheld computing device. It may be a mobile phone, a tablet computer, a payment terminal, a laptop, a portable computing device or a personal computer.

Also according to the invention there is provided a system arranged and configured to implement any embodiment of the method described herein. Any feature(s) described in relation to the method may also be applicable to the system, and vice versa.

Thus there is provided a verification system comprising:
  an electronic device;
  a screen associated with the electronic device;
  wherein the electronic device is arranged to:
  generate an operable, scrambled keypad and provide said keypad within a display zone of the screen; and
  present an image of a non-scrambled keypad within at least part of the display zone such that at a user is able to operate at least one operable key of the keypad via the image.

In one or more embodiments, the invention may comprise an apparatus or method substantially or partially as disclosed in WO 2014/013252. However, WO 2014/013252 discloses an arrangement wherein a plurality of scrambled keypad configurations is sent from a remote server to the electronic device for use in generating a plurality of scrambled, operable keypads. Moreover, WO 2014/013252 discloses the use of a scrambled image superimposed over an operable keypad.

By contrast, in accordance with the present invention, the keypad image depicts a non-scrambled keypad. More than one image may be generated and used on top of one or more scrambled keypads. While one or more images in the plurality of images may depict a scrambled keypad, at least one image in the plurality depicts a non-scrambled keypad. The use of a non-scrambled image superimposed or displayed over an operable keypad provides the advantage that the user is presented with a keypad configuration that is familiar and expected. This results in fewer input errors being made by the user than when an image of a scrambled keypad is used.

As the image is not scrambled, the mapping between the non-scrambled image and the scrambled operable keypad may need to be known by, or communicated to, the remote device (server) in order for decoding to be performed. Therefore, the use of a non-scrambled image gives rise to several non-trivial issues which must be addressed by the present invention.

A plurality of keypad images may be generated and/or a plurality of operable keypads. However, at least one of the images will depict a non-scrambled keypad and be provided over a scrambled, operable keypad so as to provide a mapping between the 'keys' of the image and the functional keys of the underlying operable keypad.

The term 'non-scrambled' in this context can be interpreted as meaning that the keys depicted in the image are in accordance with a standard format or configuration. The order of the 'keys' depicted in the image may be as expected by the user. The values assigned to the respective keys may therefore be contiguous. They may be arranged in ascending or descending order.

By contrast, the term 'scrambled' may be interpreted as meaning that the order of the keys is randomised, or somehow deviates from the default, standard or expected order. The standard configuration may be standard relative to the device. The term 'scrambled' may be used to mean that the keys in a keypad configuration are altered relative to a reference configuration. The reference configuration may be specified by a keypad configuration which is native to, or provided as standard with, the device.

The image may be generated on the user's electronic device, or may be sent to and received by the device from a separate resource.

One or more keypad configurations may be sent to the device from a remote computing resource eg server. The one or more keypad configurations may be used to generate the operable, scrambled keypad. The keypad configuration may be sent to the device as a filename.

Additionally or alternatively, one or more scrambled keypad configurations may be generated on or at the electronic device itself. The at least one scrambled keypad configuration may then be used to generate at least one operable keypad. The keypad image and/or operable keypad may also be generated on or at the electronic device. Advantageously, the workload is transferred from the remote resource to the local device. It also avoids the need for transmittal of the configuration(s) to the device.

The operable keypad may be generated by executing a subroutine such as a function, method or procedure on the electronic device. The subroutine may be part of a library. The library may be provided as standard to the electronic device. Execution of the subroutine may cause a keypad object to be generated in volatile memory on the electronic device. The keypad object may be a virtual, electronic model a mechanical keypad. The operable keypad may be generated at run-time.

The phrase 'on or at' may be interpreted as meaning that the scrambled keypad configuration is generated by the electronic device itself, or by one or more devices which are associated with the electronic device eg by physical or wireless connection to the electronic device. The scrambled keypad configuration may therefore be generated locally to the electronic device (client) rather than being received from a remote resource (server).

The phrase 'keypad configuration' may be used herein to refer to the order, arrangement or position of keys in a keypad. It may also be used to refer to the order of 'keys' as depicted in the keypad image although it should be noted that in reality the image does not actually comprise operable 'keys'.

Preferably, the scrambled keypad configuration is generated on or at the electronic device by a software component, which may be referred to as a keypad generation component (KGC), and may be arranged to generate the image(s) and/or operable keypad(s). Additionally or alternatively, it may be arranged to generate one or more configurations for specifying the arrangement of keys in the scrambled operable keypad(s). The keypad generation component may be arranged to generate a Pin Entry Device (PED). This may be a virtual, non-physical PED. The component may be installed on the electronic device after download from a remote resource ie remote with respect to the electronic device. The remote resource may be a server. It may be a cloud-based resource.

The software component may be configured to receive an input. It may be configured to use the input to provide one or more keypad configurations for use in generation of the keypad image(s) and/or operable keypad(s). The input may be a pseudo or true random number, or it may be biometric data related to a user. The user may or may not be associated with the electronic device.

The keypad image may be a representation of a keypad. It may be a static image or a moving image. It may comprise a watermark. It is distinct and distinguishable from the operable keypad in that the image resembles a keypad but does not comprise any keypad functionality. Therefore, while portions of the image may represent or depict 'keys', and may appear as such to the user, the image itself or portions thereof do not possess any operable properties. Thus, clicking on, touching or otherwise selecting a portion of the keypad image may not, in itself, result in an input being received by the electronic device. In one or more embodiments, one or more keys depicted in the image may be colour coded, watermarked or otherwise tagged to provide a visual assurance to the user that the image has been provided by a legitimate source.

By contrast, the operable keypad comprises the functionality and properties which the skilled person would associate with a functioning keypad. Thus, the operable keypad may comprise a plurality of keys or buttons. The keypad is configured such that each key or button has a value (eg digit, letter or other symbol) associated with it. This assignment of values to keys may typically be performed upon creation of the keypad (when a subroutine is invoked at run time) but the associations may be changed after creation if the keypad is re-configurable. In either event, the association of values to keys is performed prior to entry of the user's input such that when the user selects a given key, its pre-defined value is put into a portion of memory in the electronic device. The portion of memory may be a keyboard buffer.

The invention may enable the user to provide an input to the electronic device by operating one or more keys of the operable keypad via or through the image. The keypad image may be superimposed over the operable keypad in the sense that the operable keypad is provided within the display zone of the screen but the image is presented at least partially within the same display zone such that it obscures or masks the operable keypad from the user's view. The operable keypad may be in the background, listening for an input, even though the user cannot see it. Preferably, the image masks the operable keypad completely so the user appears to see an operable keypad but in reality is only able to see an image of a keypad. Preferably, the symbols on the operable keys of the underlying keypad may not correspond to the position of the 'keys' as shown in the keypad image. This is because the image depicts a non-scrambled keypad while the underlying keypad is scrambled. In other words, the configuration of the operable keypad may not match or be the same as the configuration of the keypad depicted in the image. Thus, when the user selects what appears to be a key in the keypad image, the operable keypad active and listening within the display zone may cause a different symbol to be entered into the device's memory. In this manner, the user's real (ie intended) input may never be received into any portion of the device's memory. It may never be received by the keyboard buffer. An encoded version of the identifier is created due to the mapping between the different configurations used to generate the keypad and the image.

This feature provides the significant advantage that the user's real input cannot be obtained by any party who has gained unauthorised access to the electronic device. It also distinguishes the invention over known solutions wherein data such as positional data or an identifier is received from the user into memory and then translated into an encoded version of the user's input.

One or a plurality of operable keypads may be generated on the electronic device during an authentication session. Additionally or alternatively, one or a plurality of keypad images may be generated during the session. One or more keypads may be generated from one (scrambled) keypad configuration.

A plurality of operable keypads and/or keypad images may generated. They may be arranged or ordered in a series, stack or queue or other data structure.

One keypad in the plurality may be designated or selected as the active operable keypad for receiving input from a user. The active operable keypad may be the keypad which is provided 'beneath' the image such that when the user selects a portion of the image on the screen, the active operable keypad is caused to function. Preferably, there is only one active keypad at any given point in time. The remaining operable keypads in the plurality may be dormant or inactive until designated as the active keypad. Thus, a plurality of operable keypads may be generated and placed into a data structure. The data structure may be iterated over so that the operable keypad designated as the active one changes over time. The change may be effected following a certain period of time or after an event such as an input being received from a user. Thus, after an input from the user, the active operable keypad may be replaced or exchanged for another operable keypad in the plurality. The previously active keypad may be erased from memory, or marked for removal, once it has become inactive. Thus, once an input (keystroke) has been received using a particular operable keypad it may be deleted from the electronic device.

Alternatively, rather than cycling through a plurality of pre-generated operable keypads, a new operable keypad may be generated for each input when needed. Each newly generated operable keypad may comprise a different configuration of keys from the others. A new operable keypad may be generated when an input is expected or required from the user. For example, if the identifier is four digits long a first keypad may be used for receipt of the first input, then second keypad generated for receipt of the second input and so on for all four inputs.

Further still, a mutable (changeable) keypad may be provided in addition to or instead of a plurality of operable keypads. The configuration of the mutable operable keypad may be altered after or upon an event such as receipt of an input from a user, or after a certain period of time. Thus, the same operable keypad may remain as the active one, but the arrangement of the keys may change. The scrambled keypad configurations may be used to determine the different configurations of the keypad.

The scrambled keypad configuration(s) may be generated using a true random number generator or pseudo random number generator. The true or pseudo random number (hereinafter simply 'the random number') may be fed as input into the software component referred to as the keypad generation component. Thus, when using a random number as input to the configuration component, different keypad configuration(s) may be produced each time the invention is used by the same user.

Preferably, the random number is generated locally to the electronic device. It may be generated on the processor of the electronic device or using a device which is in local communication (wired or wireless) with the device. Thus, it may be generated by a plug-in device or a device connected to the electronic device via a wireless protocol such as Bluetooth, NFC etc.

The scrambled keypad configuration may be generated using biometric data related to a user. The biometric data may be generated or captured in a variety of ways. As with respect to the random number generation above, it is preferably generated by the electronic device or locally to the electronic device. The biometric data may comprise any form of data relating to a physical or behavioural attribute of the user. It may comprise data relating to, or derived from, a fingerprint, iris pattern etc. The biometric data may be derived from "raw" biometric data which has been captured by a biometric data capture device. The invention is not to be limited with respect to the type of biometric data used or the manner in which it is collected or processed. Various biometric data capture and analysis systems are known in the art and considered to be suitable for use with the present invention.

The biometric data may be processed to provide a sequence or identifier which is unique to the user. The sequence may be a string of values or characters. This string may be fed into the software component (KGC) so as to specify the order of keys in one or more operable keypads and/or images generated by or at the electronic device. Thus, when using biometric data as input to the software component, the same keypad configuration(s) may be produced each time the invention is used by the same user.

The biometric data may be used to generate a seed which is then used to influence the configuration(s). Additionally or alternatively, some other form of data may be used as the input to the keypad configuration algorithm. This data may be derived from or in some way related to the user's biometric data. It may be, for example, a cryptographic key. The cryptographic key may be used in the generation of a seed for input to the configuration generation component. The key may be a private or public cryptographic key which is associated with the user and/or a digital wallet associated with the user. The wallet may be stored on the electronic device. The cryptographic key may have been generated during a biometric authentication process, or a registration process involving the capture of the user's biometric data. For example, the public/private key may have been generated during the creation, set up or registration of a digital wallet such as, for example, a Bitcoin or other cryptocurrency wallet.

The electronic device may be a mobile and/or handheld device such as a smart phone, tablet, payment terminal, payment card reader or smart-card reader. Additionally or alternatively, it may be a personal computing device associated and/or registered with a user. This distinguishes the invention over those prior art arrangements which are designed for use with non-personal computing devices such as ATM machines. The term 'personal computing device' is used herein to refer to an electronic computing device, such as a PC, laptop, mobile phone, tablet computer which can be associated with, registered to, and/or owned by an individual.

Preferably, the operable keypad and/or the keypad image is erased from the device following one or more input(s) from a user, or following a specified period of time. The position of the display zone on the screen, and/or its dimensions, may be specified by a subroutine such as a procedure or method call. The display zone may comprise a plurality of sub-zones, each sub zone corresponding to a keypad key. The sub-zone may be referred to as 'hot spots'. Thus, selection of a particular hot spot on the screen may cause a key of the active, operable keypad to be activated such that an (encoded) input is placed into memory.

Preferably, the method comprises the step of storing an encoded version of a user's identifier in memory associated with the electronic device, the identifier being received by the operable keypad via the keypad image such that the user's identifier is never stored on the device in an un-encoded form.

It may comprise the steps of storing an encoded version of an identifier entered into the electronic device by the operable keypad via the keypad image; and transmitting the encoded version of the identifier to a remote computing resource.

A scrambled keypad configuration may be transmitted to the remote computing resource. A plurality of scrambled keypad configurations may be sent to the remote computing resource. The remote computing resource eg server may decode the encoded version of the user's identifier. It may use one or more scrambled keypad configurations to decode the encoded version of the user's identifier.

The invention may be arranged to generate one keypad configuration for each value in the user's identifier. Additionally, it may generate a keypad configuration for use in generating a keypad image.

The invention also provides an electronic computing apparatus arranged and configured to implement the method described above. The apparatus may comprise a screen and at least one software component arranged and configured to perform any version of the method described above. The screen may be a touch screen.

The apparatus may comprise, or be associated with or in communication with:
a true random number generator and/or a pseudo random number generator;
means for capturing or generating biometric data related to a user; and/or
means for reading data from a smart card. The smart card may be a payment card. It may be any type of IC card which is independent of the operation of the device ie it may not be a SIM card.

The invention also provides a verification method comprising the steps of:
using biometric data related to an individual to generate a keypad configuration;
using the keypad configuration to generate an operable keypad and/or a keypad image.

Any or all of the features described above may also apply to this aspect of the invention. A plurality keypad images may be generated wherein at least one is an image of a non-scrambled keypad.

Preferably, the keypad configuration is a scrambled keypad configuration. Thus, the order of keypad keys specified by the configuration may be altered relative to a default or reference configuration.

The method may include the steps of:
capturing, generating or receiving the biometric data on or at an electronic device;
generating the operable keypad and/or keypad image on or at the electronic device.

The invention also provides an electronic payment device comprising:
a touch screen;
a component arranged to read a payment card or other IC card; and
software arranged to:
generate at least one keypad configuration from biometric data related to an individual, and/or a true or pseudo random number; and
generate a keypad image and/or operable keypad using the at least one keypad configuration.

The payment or other IC card may be separate to the electronic device. It may be physically independent of the electronic device. It may be a financial card such as bank or credit card. It may not provide functionality for the device. It may be distinct and different from a SIM card.

Also in accordance with the invention there is provided a verification method comprising the steps of:
displaying an image of a non scrambled keypad over a first operable keypad within a zone of a screen associated with an electronic device;
using the first operable keypad to obtain a first keystroke from a user; and
using at least one further keypad to obtain at least one further keystroke;
wherein the configuration of the first and/or at least one further operable keypad, and/or the configuration of the keypad image, is determined using an input sequence generated on or captured locally to the electronic device.

Any or all of the features described above may also apply to this aspect of the invention.

The non scrambled image may be superimposed over the scrambled, operable keypad as described above in relation to other aspects of the invention. In this way, the image may provide a mask or cover which obscures the operable keypad at least in part. Thus, the user may see the non scrambled keypad image instead of the scrambled operable keypad such that when the user selects a portion of the image, the operable keypad is caused to function. Thus, the method enables an encoded version of the user's input to be received by memory (eg keyboard buffer).

A plurality of operable keypads may be generated on the electronic device. At any given time, one operable keypad may be selected or arranged as the active keypad. The active keypad may be the one which is executed by the device so as to obtain the next keystroke from the user.

The input sequence may be a pseudo random number. Additionally or alternatively, the input sequence may be generated using biometric data related to the user.

An encoded version of an identifier may be constructed. The encoded identifier may comprise the first keystroke. It may comprise the at least one further keystroke. The identifier may be a code, password or other any other type of identifier associated with the user.

The scrambled keypad may comprise a configuration of keys which are in a randomised order or a different order relative to a default or reference keypad configuration. A different scrambled, operable keypad may be used to obtain each keystroke obtained from the user. Each operable keypad in the plurality may be different from the others in the plurality in the sense that it is a separate, distinct operable keypad. Alternatively, only one mutable, operable keypad may be generated and the order of keys reconfigured for each keystroke. Thus, the keypads may be different in the sense of having different key configurations.

The electronic device may be a mobile or handheld device such as a smart phone, laptop computer, tablet computer or payment terminal. The electronic device may comprise software and/or hardware capabilities for reading data from a card. The card may be an IC or smart card such as a payment card. The card may be independent to the operation of the electronic device. In other words, the card may not be a SIM card or other 'card' integral to the operation of the device.

One or more aspects of the invention may be described as providing a two-factor authentication solution. It may provide a solution wherein:

1) The identity of the user is verified using biometric data; and
2) The user's authorisation to perform the transaction is verified by entry of a correct, pre-selected identifier.

It is important to note that for the sake of brevity and clarity, some features described above in relation to one aspect of the invention may not have been repeated in relation to other aspects of the invention. However, any feature mentioned above in relation to one aspect of the invention may be equally applicable to any other aspect of the invention. Features described in relation to the system may also be used in relation to the method and vice versa.

These and other aspects of the present invention will be apparent from and elucidated with reference to, the embodiment described herein. An embodiment of the present invention will now be described, by way of example, and with reference to the accompanying drawings.

BRIEF DESCRIPTION OF THE DRAWINGS

FIG. 1 shows a flowchart illustrating one possible embodiment in accordance with the method of the invention.

DETAILED DESCRIPTION

The invention provides a secure authentication solution for verifying the identity of an individual. The invention may be used as part of a wider authentication process or system not described herein.

In one embodiment, the present invention deviates from the authentication technique described in WO 2014/013252 which involves presenting an image of a scrambled keypad on a user's electronic device eg mobile phone such that it obscures an operable keypad from the user's view. The user, therefore, sees what appears to be an operable keypad, but in fact is simply an image devoid of functionality. In accordance with the present invention, however, at least one non-scrambled image is used in conjunction with a scrambled, operable keypad.

The operable keypad underlying the image comprises keys or buttons which have symbols assigned to them, as is known in the art. The operable keypad may be referred to as a virtual keypad. The user enters his/her identifier eg PIN, password, or personal identification code (PIC) by selecting portions of the screen which depict 'keys' corresponding to the symbols in the identifier. The operable keypad which has been generated behind the image detects the user's key strokes and enters the symbols assigned to the keypad's selected keys into the buffer. This allows an encoded version of the real identifier to be constructed and sent to a remote server for verification. It is important to note that the invention does not perform a translation or encoding operation on the user's input as is known in some prior art arrangements. In such known systems, the 'real' identifier is entered into the keyboard buffer before being encoded. This enables unauthorised parties to access the user's identifier via the buffer. The invention, however, avoids this problem by never storing the real version of the identifier, even temporarily in the buffer.

As the order of the keys in the operable keypad is different from the order of the keys depicted in the image, the user's 'real' input is never actually entered into memory on the phone. This provides the significant benefit that the real identifier cannot, therefore, be derived by an unauthorised party from the phone. Further still, unless someone knows the configuration of keys in both the operable keypad and the keypad image, they cannot decode the encoded identifier.

In one embodiment, the keypad image and/or the configuration of keys for the operable keypad are generated on the user's device. This provides the advantage that the processing work is transferred to the client (user's) device rather than server. Alternatively, the image and/or configuration is being sent to the device from a remote server. In yet other embodiments, a mixture of on-device generation and server provided images/configurations may be used.

In one embodiment, a software component installed on the user's device receives an input. It uses that input to determine the configuration of keys for one or more operable keypads. Additionally or alternatively, it uses the input to determine the configuration of 'keys' to be depicted in one or more keypad images. The operable keypad(s) and/or keypad image(s) can then be generated using the configurations specified by the software component. However, at least one non-scrambled keypad image is used.

In one embodiment, the input to the generation component is a random number. In another embodiment, the input is biometric data relating to the user. The biometric data can be a fingerprint, for example. The skilled person will readily understand that any type of biometric data can be used. The invention is not limited with respect to the format, type or method of capture of the biometric data.

If a random number is used as input, the resulting configuration(s) will be different each time the invention is used. If, however, biometric data is used as the input, the resulting configurations will be the same each time the invention is used. This is because the user's biometric data eg fingerprint, retina pattern etc remains constant and will always provide the same input.

In either embodiment, the input is generated on, by or at the user's device. In other words, it is generated locally to the user's device rather than by a remote resource. The input may be generated by one or more components which comprise part of the user's device, or are in proximity to the user's device and connected thereto by a physical or wireless interface.

In use, the user registers with a system in accordance with the invention. The requisite software is then downloaded to the user's device, including the generation component.

Hereinafter, the user's device will be referred to as a mobile phone but any electronic device with computing capabilities may be used.

When the user's identity needs to be verified, the required input is generated either by a random number generator or by a biometric capture device. For example, the user may press a finger against the screen of the phone, or may look into a camera, or speak into a microphone etc. The biometric capture device generates a string which represents the captured biometric property.

The biometric data or random number (string) is then fed into the keypad generation component. This component then uses that input to generate a plurality of keypad configurations. Preferably, the order of symbols or values in each of the configurations is unique such that no configuration is duplicated. The keypad configurations may be generated from the random or biometric string using values or substrings selected from the string. For example, the first ten values of the string may be used for the first 10-digit keypad configuration, the next ten values may be used for the second configuration and so on. Thus, the component must ensure that the input string is of sufficient length to provide the required values for the keypad configurations.

In an illustrative embodiment using a keypad comprising the digits '0' through to '9', there will be ten values (ie characters, digits or symbols) in each configuration generated by the invention. The number of configurations generated will be the number of values in the user's identifier plus one. This will enable one scrambled, operable keypad to be generated per keystroke required from the user to enter the identifier, plus one for a keypad image. For example, in an embodiment wherein the user's identifier consists of 4 values, the configuration generation component will produce 5 configurations: one for each digit in the identifier and one for generation of the image that the user will see.

Only one operable keypad is 'active' at any given time. Thus, when the user selects (what appears to be) a key on the image, only the active keypad is able to detect the user's input. In an embodiment wherein a plurality of operable keypads has been pre-generated by the device at the start of an authentication session, only one is designated, arranged or executed so as to be the active operable keypad for receipt of the user's next keystroke. After receipt of an input, the active keypad may be altered in some way (eg the keys may be reconfigured) or may be deselected as the active keypad (eg by deletion from memory or removal from the stack).

It should be noted, though, that the user's identifier can be any type or length of identifier, comprising any type of value. It may comprise any type of characters or symbols.

At least one image is an image of a default (non-scrambled) keypad. Thus, the 'keys' depicted in the image are presented in a sequential order as expected by the user in conformity with, for example, the standard keypad of the device. In other embodiments, only one underlying, operable keypad may be generated and used to receive all keystrokes from the user. In yet other embodiments, more than one keypad images may be used over the top of one or more operable keypads. This plurality of images may include at least one image of a scrambled keypad. The image may be changed after each input (keystroke) from the user, or may be changed after a predetermined event such as three incorrect attempts. For example, a scrambled image may be used to obtain the user's identifier, but if this is unsuccessful or verification fails, another scrambled keypad image is used and the authentication process is repeated. Upon three unsuccessful attempts using scrambled images, the user may be presented with an image of a non-scrambled keypad.

It should be noted that a scrambled image may be used in conjunction with a scrambled or non-scrambled operable keypad. However, when a non-scrambled image is used, it is arranged to mask a scrambled operable keypad in order to provide the necessary mapping for encoding purposes.

Turning to FIG. 1, the general concept utilised by an embodiment of the invention wherein the keypad configuration is generated on the device, may be expressed as follows:

1. Generate an input string on or at the user's device using biometric data capture or random number generation—see FIG. 1, step 101.
2. Feed the input string into a keypad generation component (KGC)—step 102
3. The generation component uses the input string to generate 5 keypad configurations—step 103
4. Use one of the keypad configurations to generate and display an image of a scrambled keypad, and use the remaining configurations to generate 4 scrambled, operable keypads to underlie the image;
   superimpose the image 'over' the active operable keypad so that when the user provides an input (keystroke) via the image, the active keypad reads an input into the buffer—step 104
5. Construct encoded version of user's identifier from multiple inputs detected by operable keypad(s)—step 105
6. Send encoded version of user's identifier and 5 keypad configurations to remote location for decoding—step 6
7. If the user's inputted identifier is incorrect (ie verification fails), repeat the authentication process; in a subsequent authentication process (eg after three failed attempts) repeat the process using an image of a non-scrambled keypad with a scrambled operable keypad In one implementation, the keypad configurations which are derived from the (random or biometric) input string can be used as inputs to procedure calls which are executed and placed onto the runtime stack.

An illustration of one embodiment of the invention might be expressed as follows:

```
String input           // input (RN/biometric) used to generate keypad
                          configurations
String usersInput      // (encoded) identifier built from user's
                          keystrokes
int p = 10             // number of keys on keypad
int start = 0          // index of start of substring in input
int end = p - 1        // index of end of substring in input;
input = getInput( )    // get input String somehow: random number or
                          biometric data
// display image of scrambled keypad using first p chars from input
generateandDisplayImage(input.substring(start, end))
// increment start and end indices in the input String
start = start + p
end = end + p
for (int i = 0; i < N; i++){   // N == length of PIN
    // generate a new keypad using next p values from input
    Keypad k = new Keypad(input.substring(start, end))
    //get user's keystroke and add to return String
    usersInput.concat(k.getKeyStroke( ))
    // increment start and end indices in the input String
    start = start + p
    end = end + p
}
return usersInput // send user's encoded input for decoding and verification
```

In the above illustration, a new keypad is generated as and when required for each expected keystroke. In an alternative implementation, a plurality of keypads with different configurations may be pre-generated at the start of the session and placed into a data structure. The encoded result can then be generated by iterating over that the data structure.

```
Stack keypads                     // data structure to hold the keypads
for(int i = 0; i < N; i++){
    //populate the Stack of keypads
    keypads.push(new Keypad(input.substring(start, end))
    // increment start and end indices in the input String
    start = start + p;
    end = end + p;
}
for(int i = 0; i < N; i++){       // iterate over the Stack, one key stroke
                                  per keypad
    String temp = keypads.pop( ).getKeyStroke( )
    usersInput.concat(temp)       // build encoded version of user's input
}
```

In yet another implementation, only one mutable, operable keypad object may be generated. The plurality of configurations may then be used to alter the order of the keys in the same operable keypad after each keystroke has been detected.

Once the user's encoded identifier has been constructed, it can be sent to a remote server for comparison against the stored version of the identifier. In order to decode the identifier, the server needs to know the mapping of the keys in the keypad(s) and image. Therefore, the keypad configurations generated by the user's device are also sent to the server.

The invention may be implemented on a payment terminal. The payment terminal might incorporate a card-reading component so that data can be read from the chip and/or magnetic strip of an IC card, or via NFC/contactless communication technologies. The payment terminal can be a dedicated device for processing payments and authenticating a user for such transactions. Therefore, such a payment terminal is not a general purpose computing device such as a smart phone or PC. In other embodiments, the invention can be implemented on a non-dedicated device such as a mobile phone, tablet computer, personal computer, lap top etc. This non-dedicated device may be associated with an individual user or group of users. For example, a phone registered to a user.

Therefore, the invention provides a secure authentication solution even when implemented on a mobile device. The generation of the keypad configurations on the user's device provides the benefits that processing is performed locally rather than remotely. The combination of biometrics with identifier eg PIN provides a multi-factor authentication which requires the user to be identified on the device ('who the user is') and then authenticated by identifier ('what the user knows'). This alleviates security concerns relating to the use of biometric authentication alone.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A verification method arranged to verify the identity of a user, comprising:
   generating an operable, scrambled keypad and providing said operable, scrambled keypad within a display zone of a screen associated with an electronic device; and
   presenting an image of a non-scrambled keypad within at least part of the display zone such that the operable, scrambled keypad is hidden from the user's view at least in part and the user is able to operate at least one key of the operable, scrambled keypad via the image of the non-scrambled keypad;
   wherein a mapping is generated between keys depicted in the image of the non-scrambled keypad and the keys of the operable, scrambled keypad, and the mapping enables an encoded version of an input from the user to be inputted into the electronic device.

2. The verification method according to claim 1, wherein:
   the operable, scrambled keypad is generated at run-time by invoking a portion of code.

3. The verification method according to claim 1, wherein:
   the operable, scrambled keypad is generated by a subroutine which is provided as standard with the device.

4. The verification method according to claim 1, wherein:
   the image of the non-scrambled keypad depicts a keypad which is a default keypad associated with the device.

5. The verification method according to claim 1, wherein:
   the image of the non-scrambled keypad is generated on the device, or
   the image of the non-scrambled keypad is received by the device from a remote computing resource.

6. The verification method according to claim 1, wherein:
   the operable, scrambled keypad is generated using a keypad configuration derived using a random, or pseudo-random, number, or biometric data relating to the user.

7. The verification method according to claim 1, wherein:
   an order of the operable keys in the operable, scrambled keypad is at least partially determined using biometric data derived from or associated with the user.

8. The verification method according to claim 7, wherein:
   the biometric data comprises, or is processed to provide, one or more strings, arrays or sequences of values which are used to specify the order of the operable keys in the operable, scrambled keypad.

9. The verification method according to claim 1, wherein:
   a plurality of operable keypads is generated, and wherein at least one keypad in the plurality is a scrambled keypad which is selected as the operable, scrambled keypad.

10. The verification method according to claim 1, wherein:
    a plurality of keypad images is generated, and wherein at least one image in the plurality is an image of a non-scrambled keypad which is selected as the image of the non-scrambled keypad.

11. The verification method according to claim 1, further comprising:
    transmitting the encoded version of the input to a remote computing resource.

12. The verification method according to claim 1, wherein:
the electronic device is a mobile phone, a tablet computer, a payment terminal, a portable computing device or a personal computer.

13. The verification method according to claim 1, wherein:
the image of the non-scrambled keypad masks the operable, scrambled keypad from the user's view at least in part.

14. A verification system comprising:
an electronic device; and
a screen associated with the electronic device,
wherein the electronic device is configured to: generate an operable, scrambled keypad and provide said operable, scrambled keypad within a display zone of the screen; and present an image of a non-scrambled keypad within at least part of the display zone such that the operable, scrambled keypad is hidden from the user's view at least in part and the user is able to operate at least one key of the operable, scrambled keypad via the image of the non-scrambled keypad; and
wherein a mapping is generated between keys depicted in the image of the non-scrambled keypad and the keys of the operable, scrambled keypad, and the mapping enables an encoded version of an input from the user to be inputted into the electronic device.

15. The verification system according to claim 14, wherein:
the image of the non-scrambled keypad masks the operable, scrambled keypad from the user's view at least in part.

* * * * *